Aug. 11, 1925.

E. T. SMITH

COVER LOCK FOR MILK CANS

Filed Nov. 12, 1924

1,549,514

E. T. Smith,
INVENTOR

BY Victor J. Evans,
ATTORNEY

WITNESS:

Patented Aug. 11, 1925.

1,549,514

UNITED STATES PATENT OFFICE.

ELMER T. SMITH, OF BOON, MICHIGAN.

COVER LOCK FOR MILK CANS.

Application filed November 12, 1924. Serial No. 749,516.

*To all whom it may concern:*

Be it known that I, ELMER T. SMITH, a citizen of the United States, residing at Boon, in the county of Wexford and State of Michigan, have invented new and useful Improvements in Cover Locks for Milk Cans, of which the following is a specification.

My invention relates to locks for milk can covers and its principal object is to provide a lock to be associated with the cover of a milk can to hold the same against accidental displacement while the same is being handled.

A further object of the invention is to provide a milk can cover securing device which can be associated with any milk can now in use and which can be readily engaged or disengaged therefrom.

The invention further contemplates a locking device of this character embodying a pair of spring urged telescopic members to be arranged within the mouth of a milk can and engaged through the cover to positively lock the same in place.

With the preceding and other objects and advantages in mind, the invention consists in the novel combination of elements, construction and arrangement of parts and operation to be hereinafter specifically referred to, claimed and illustrated in the accompanying drawing, in which:

Figure 1:
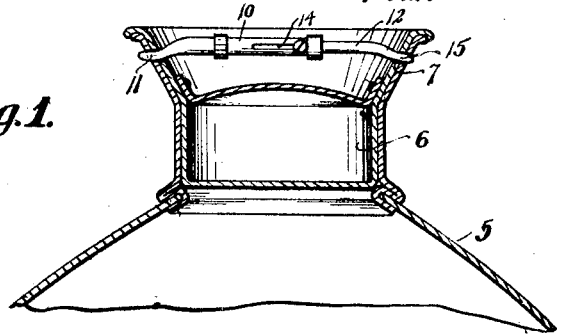
Figure 1 is a fragmentary sectional view of a milk can with which my invention is associated.
Figure 2:
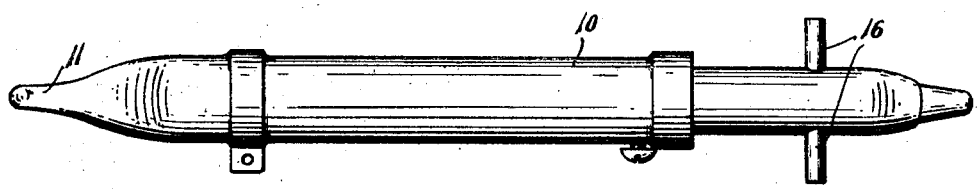
Figure 2 is an elevation of the can cover lock.
Figure 3:
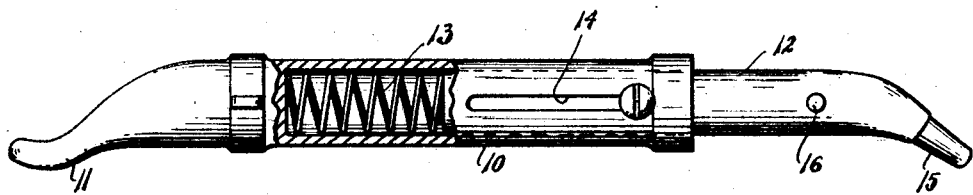
Figure 3 is a view taken at right angles to Figure 2 and having parts broken away.

Referring to the drawings in detail wherein corresponding characters of reference denote corresponding parts throughout the several views, the numeral 5 denotes a conventional milk can equipped with a removable cover 6, the mouth of the can and the cover being provided with a registering opening 7.

My invention consists of a tube 10 having one end cast with a downwardly curved tapered locking bolt 8.

Slidable in the tube 10 is a plunger rod 12 which is normally pressed outwardly by an expansion spring 13 accommodated in the tube 10. This tube is also provided with a longitudinal slot 14 which receives a laterally extending pin carried by the plunger rod 12 which serves to limit the longitudinal movement of the plunger rod 12 and at the same time holds the member 12 and tube 10 against axial movement with respect to each other. The outer end of the plunger rod 12 is also formed with a downwardly extending locking bolt 15 also adapted to pass through the registering opening in one side of the cover and can.

Figure engaging elements 16 extend laterally from opposite sides of the plunger rod 12 at diametrically opposite points which are adapted to be engaged by the fingers in order to move the plunger rod inwardly against the tension of the spring 13 in order to disengage the device from the milk can. An ear 17 is cast with the tube 10 adjacent one end for the purpose of receiving the usual seal.

From the disclosure it will be manifest that the device is arranged transversely within the milk can cover with the parts 11 and 15 passing transversely through the registering openings 7. In order to disengage the device from the milk can cover, it is simply necessary to move the plunger rod 12 within the tube 10 against the tension of the coil spring 13.

While I have shown and described the preferred embodiment of the invention, it should be understood that changes in the construction and arrangement of parts may be made, and that I am only limited by the appended claim.

What is claimed is:—

A combined handle and lock for milk cans comprising a tube, closed at one end, and provded with a longitudinal slot, a plunger slidably arranged in the tube, a pin carried thereby and extending through the slot, a spring in the tube normally urging the plunger and tube away from each other, and downwardly curved tapered members carried by the closed end of the tube and the outer end of the slidable member and adapted to be passed through openings in a milk can and its cover, and a finger engaging element carried by the slidable member whereby to move the same against the tension of the spring.

In testimony whereof I affix my signature.

ELMER T. SMITH.